United States Patent [19]

Niskanen et al.

[11] Patent Number: 5,244,448
[45] Date of Patent: Sep. 14, 1993

[54] METHOD AND APPARATUS FOR REGULATING THE TEMPERATURE OF AN ADJUSTABLE-CROWN ROLL

[75] Inventors: Juhani Niskanen, Oulunsalo; Juhani Eskelinen, Jyväskylä, both of Finland

[73] Assignee: Valmet Paper Machinery Inc., Finland

[21] Appl. No.: 885,464

[22] Filed: May 19, 1992

Related U.S. Application Data

[63] Continuation of Ser. No. 734,553, Jul. 23, 1991, abandoned, which is a continuation of Ser. No. 525,495, May 17, 1990, abandoned.

[30] Foreign Application Priority Data

May 22, 1989 [FI] Finland .................... 892463

[51] Int. Cl.⁵ .................... B21B 31/32; B60B 9/22
[52] U.S. Cl. .................... 492/5; 492/7; 492/46; 165/90
[58] Field of Search .................... 29/113.1, 113.2, 116.1, 29/116.2; 492/4, 5, 6, 7, 46; 165/2, 34, 38, 89, 90

[56] References Cited

U.S. PATENT DOCUMENTS

| | | | |
|---|---|---|---|
| 3,023,695 | 3/1962 | Küsters | 29/113.2 X |
| 4,154,160 | 5/1979 | Küsters | 29/116.2 X |
| 4,307,501 | 12/1981 | Ahrweiler | 29/116.2 X |
| 4,506,421 | 3/1985 | Appenzeller et al. | 29/116.2 |
| 4,757,583 | 7/1988 | Pav et al. | 29/116.2 X |
| 4,757,584 | 7/1988 | Pav et al. | 29/116.2 X |
| 4,897,905 | 2/1990 | Moschel | 29/116.2 |
| 4,964,202 | 10/1990 | Pav et al. | 29/116.2 |
| 5,079,817 | 1/1992 | Anstötz et al. | 29/116.2 X |

FOREIGN PATENT DOCUMENTS 0637177 12/1978 U.S.S.R. .................... 29/116.2

Primary Examiner—Timothy V. Eley
Assistant Examiner—C. Richard Martin
Attorney, Agent, or Firm—Steinberg & Raskin

[57] ABSTRACT

The invention concerns a method and apparatus for regulating the temperature of an adjustable-crown roll. The roll mantle (12) arranged to revolve on the stationary axle (11) of the roll (10) is loaded by passing a pressure medium into a pressure chamber (15) or series of chambers formed between the axle (11) and the mantle (12) so as to correct the deflection of the roll mantle (12). The roll (10) is additionally heated/cooled by passing heating/cooling fluid into the roll (10). The heating/cooling fluid used for the regulation of the temperature of the roll (10) is introduced into the roll (10) so as to be substantially uniformly distributed over the surface area of the roll (10) such that heat is removed or produced in the radial direction of the roll. The heating or cooling fluid is passed into the pressure chamber (15) in the roll (10), in which case, by its means, pressurization of the chamber (15) is also accomplished, and/or into the unpressurized chamber (16) of the roll (10), in which case the function of the fluid is exclusively regulation of the temperature. The invention further concerns a regulation system for carrying out the method.

7 Claims, 1 Drawing Sheet

METHOD AND APPARATUS FOR REGULATING THE TEMPERATURE OF AN ADJUSTABLE-CROWN ROLL

This is a continuation of application Ser. No. 734,553, filed Jul. 23, 1991, which is a continuation of U.S. Ser. No. 525,495 filed May 17, 1990, all now abandoned.

BACKGROUND OF THE INVENTION

The invention concerns a method for regulating the temperature of an adjustable-crown roll, in which roll the roll mantle arranged to revolve around a stationary axle is loaded by passing a pressure fluid into a pressure chamber or series of chambers formed between the axle and the mantle so as to correct the deflection of the roll mantle, and which roll is respectively heated or cooled by passing heating or cooling fluid into the roll.

The invention further concerns an apparatus intended for carrying out the method in an adjustable-crown roll, which comprises a roll mantle arranged to revolve on a stationary axle by means of end bearings, the axle and roll mantle being sealed relative to one another by means of longitudinal seals such that, between the axle and the roll mantle, these longitudinal seals define a pressure chamber or a series of chambers, the deflection of the roll mantle being adjusted by means of the pressure of the pressure fluid supplied into the pressure chamber or series of chambers, and in which roll circulation devices are provided for heating/cooling fluid for regulation of the temperature of the roll.

In paper making machines, such rolls are commonly used to respectively form a dewatering press nip, a smoothing nip, or a calendering nip together with a backing roll. In these uses and also, e.g., in a supercalender, it is important that the distribution of the linear load, i.e. the profile, in the nip in the axial direction of the rolls can be made constant or that this profile can be regulated as desired, for example with a view to controlling the transverse moisture profile and/or thickness profile (caliper) of the web. For this purpose, in the prior art, several different adjustable-crown rolls are known, by means of which attempts are made to act upon the distribution of the linear load in a nip. As a rule, such rolls comprise a massive tubular, stationary roll axle and a roll mantle arranged to revolve around the roll axle. Between the axle and the mantle, a glide-shoe arrangement and/or a chamber or series of chambers of pressure fluid are fitted, which act upon the inner face of the mantle, so that the axial profile of the mantle at the nip can be straightened or adjusted as desired. The present invention is in particular related to such variable-crown rolls in which there is a chamber or series of chambers of pressure fluid between the roll axle and the roll mantle, the distribution of linear load of the roll being adjusted as desired by passing pressure fluid into this chamber or series of chambers.

In such rolls, one problem arises with the temperature profile of the roll. Especially in rolls in which the roll mantle is provided with a resilient coating, such as a polyurethane or rubber coating, it is important that the temperature level of the roll mantle should be sufficiently low and uniform. A uniform temperature promotes the formation of a uniform linear load as well as uniformity of the operation of the roll nip in the transverse direction of the web.

In the prior-art rolls of the type described above, attempts have been made to affect the roll temperature, e.g., cooling/heating fluid has been fed from one end of the roll into the pressure-fluid chamber therein, and the return-fluid duct has been provided at the opposite end of the roll. In such a roll, the temperature of the roll mantle is not uniform in the transverse direction of the roll, but rather the temperature of the roll mantle varies towards the other end of the roll, becoming higher or lower in a linear fashion, depending on whether cooling fluid or heating fluid is supplied into the pressure-fluid chamber. Additionally, attempts have been made to solve the problem of roll temperature such that, especially in rolls that require cooling, the cooling fluid has been passed into the pressure-fluid chamber, e.g., from two points. This has, however, had the consequence that the temperature distribution in the roll has been highly uneven. According to a third alternative, in prior-art apparatuses, temperature regulation has been arranged, in particular with respect to rolls about to be cooled, such that the cooling fluid has been passed into the pressure-fluid chamber in the roll at one end and removed through the opposite end, whereas the circulation of cooling fluid in the unpressurized chamber in the roll has been arranged in the opposite direction. This has, however, resulted in the substantial drawback that the temperature profile of the roll has been highly movable, which is an even more undesirable condition than a linear change in the temperature.

SUMMARY OF THE INVENTION

The object of the present invention is to provide an essential improvement over the prior art methods and apparatuses and to avoid the drawbacks related to the regulation of the temperature in prior art adjustable-crown rolls. With a view to achieving this object, the method in accordance with the invention comprises the step of substantially uniformly distributing within the roll the heating/cooling fluid used for the regulation of the temperature of the roll.

In a preferred embodiment of the invention, the pressurization of the pressure chamber or series of chambers in the roll is effected by means of the heating/cooling fluid used for the regulation of the temperature of the roll.

Moreover, the invention may be carried out such that fluid intended for regulation of the temperature is fed into an unpressurized space or chamber between the roll mantle and the axle so as to be uniformly distributed across the axial length of the roll.

The regulation apparatus in accordance with the invention comprises a first fluid-circulation circuit, i.e. a primary circuit, which is arranged to supply fluid intended for regulation of the temperature of the roll into the pressure chamber of the roll, which fluid is pressurized to the positive pressure required for the correction of the deflection of the roll mantle, and a second fluid-circulation circuit, i.e. a secondary circuit, which is arranged to supply fluid intended for regulation of the temperature into the unpressurized chamber in the roll. By "unpressurized", it is meant that the pressure within the chamber is not such as to provide a deflection of the roll mantle.

By means of the invention, a number of significant advantages are obtained over the prior art, of which, e.g. the following can be stated. By means of the method of the invention, a highly uniform temperature profile is obtained, because, especially in rolls that require cooling, the cooling fluid is passed both into the pressure chamber in the roll and into the unpressurized chamber in the roll so as to be substantially uniformly distributed over the areas that require cooling. Moreover, the pressurization of the pressure fluid is taken care of by means of the same circulation of fluid, so that cooling fluid and pressure fluid need not be fed into the pressure chamber separately. It is a further advantage of the invention that the method and the system in accordance with the invention can be applied to existing variable-crown rolls. Further advantages of the invention are explained in the following detailed description of the invention.

BRIEF DESCRIPTION OF THE DRAWINGS

In the following, the invention will be described in detail with reference to the figures in the accompanying drawing.

DESCRIPTION OF THE PREFERRED EMBODIMENTS

Figure 1:
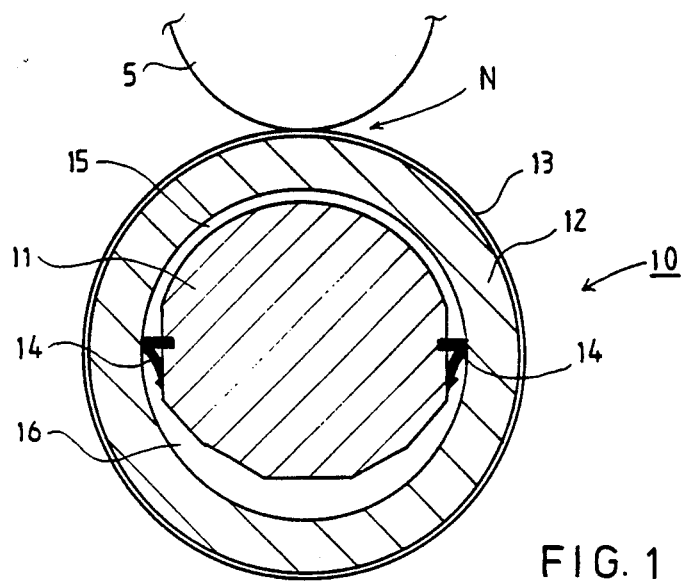
FIG. 1 is a schematical cross-sectional view of a variable-crown roll which forms a nip with a backing roll and to which the method and the system in accordance with the invention can be applied.
Figure 2:
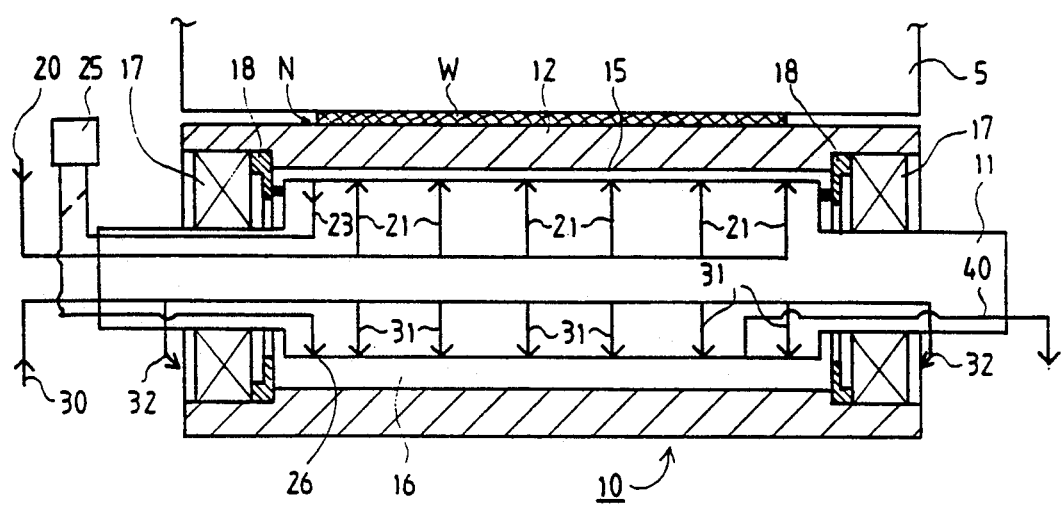
FIG. 2 is a schematical longitudinal vertical sectional view of the roll shown in FIG. 1 and of the fluid circulation system in the roll.

In FIG. 1, the variable-crown roll is denoted generally with the reference numeral 10. The roll 10 forms a nip N with a backing roll, which is denoted with the reference numeral 5. The roll 10 comprises a stationary axle 11, on which the roll mantle 12 is arranged to revolve. The mantle 12 is provided with a coating 13, which may be, e.g., polyurethane, rubber, or the equivalent. The construction of the roll 10 shown in FIG. 1 is such that therein, between the roll axle 11 and the roll mantle 12, a pressure-fluid chamber or a series of chambers is provided, the temperature profile of the roll mantle being adjusted by feeding pressure fluid into this chamber or series of chambers. This pressure chamber, i.e. the first chamber, is denoted with the reference numeral 15. The pressure chamber 15 is additionally defined by longitudinal seals 14, by means of which the roll axle 11 is sealed relative to the inner face of the mantle 12 such that a second chamber 16 remains at the other side of the longitudinal seals 14, the second chamber being unpressurized or in which the pressure is at least substantially lower than the pressure present in the first pressure chamber 15. Moreover, in FIG. 2, it is shown that the roll mantle 12 is supported on the roll axle 11 such that it revolves by means of end bearings 17 and that, in the areas of the roll ends, the pressure chamber 15 is sealed by means of end seals 18. In FIG. 2, the reference denotation W refers to the web that runs through the nip N.

FIG. 2 is a schematical illustration of a fluid-circulation and temperature-regulation system of a variable-crown roll 10. The pressure fluid required for pressurization of the pressure chamber 15 is fed into the roll through the first circuit, i.e. the primary circuit 20, from which it is passed into the pressure chamber 15 through the nozzles 21. In order that the pressure in the pressure chamber 15 can be maintained at the desired level, an outlet pipe 23 is connected to the pressure chamber 15, said pipe 23 communicating with a regulator 25 of pressure difference, through which the fluid passed out of the pressure chamber 15 is passed further along the feed pipe 26 into the unpressurized second chamber 16. The pressure fluid passed through the primary circuit 20 into the pressure chamber 15 is kept at a suitable temperature such that, if the roll 10 requires cooling, the pressure fluid also operates as a cooling fluid. By means of the several nozzles 21, which are distributed evenly across the length of the roll 10, pressure/temperature-regulation fluid, which is, for example, cooling fluid, is introduced into the pressure chamber 15 in the roll so as to be substantially uniformly distributed across the axial length of the roll. Fluid is introduced into the pressure chamber 15 in an amount appropriate to keep the roll temperature at the correct level, and the regulation of the pressure in the pressure chamber 15 is arranged by means of the pressure-difference regulator 25 by passing any excess fluid through the pressure-difference regulator 25 out of the pressure chamber 15 into the second chamber 16.

According to FIG. 2, the roll 10 is additionally provided with a second fluid circulation circuit, i.e. secondary circuit 30, by means of which the temperature-regulation fluid is passed into the unpressurized second chamber 16 in the roll. In the example of FIG. 2, the temperature-regulation fluid acts as a cooling fluid. Through the secondary circuit 30, the cooling fluid is passed into the second chamber 16 in the roll through a number of nozzles 31, such that the cooling fluid is fed so as to be substantially uniformly distributed over the axial length of the roll. In the embodiment of FIG. 2, the secondary circuit 30 also functions to provide lubrication of the end bearings 17 of the roll, and for this purpose the secondary circuit 30 is provided with lubrication nozzles 32, through which fluid is passed to the end bearings 17. Moreover, the second chamber 16 in the roll is connected with a return pipe 40, through which any excess fluid is passed out of the second chamber 16 in the roll into a tank (not shown) and then recirculated.

Thus, with reference to the above description, it is apparent that an essential feature of the invention is that the cooling/heating fluid is applied to the roll so as to be substantially uniformly distributed over the areas that require heating or cooling and that the pressurization of the pressure chamber 15 in the roll 10 is also accomplished by means of the same heating/cooling fluid. With respect to FIG. 2, it should be stated further that therein the roll 10 is shown as being provided with a unitary pressure chamber 15 which extends from end to end in the roll. The invention can, however, also be applied to rolls in which the pressure chamber 15 is divided into a series of chambers by means of transverse seals, into separate chambers in which series it is possible to feed pressures of different levels. In such a case, of course, each separate chamber in the series of chambers must be provided with an outlet pipe and with a pressure-difference regulator of its own.

Details of the present invention may easily vary within the scope of the inventive concepts set forth above, which have been presented by way of example only. Therefore, the preceding description of the present invention is merely exemplary, and is not intended to limit the scope thereof in any way.

What is claimed is:

1. A method for regulating the temperature of an adjustable crown-roll, said method comprising the steps of:

maintaining the temperature said pressure/temperature regulating fluid at a desired level to heat or cool the roll;

passing a pressure/temperature fluid into one or more pressure chambers situated between a stationary axle of said adjustable crown-roll and a mantle of said roll so as to adjust deflection and temperature of said roll mantle;

passing the same pressure/temperature regulating fluid into at least one substantially unpressurized chamber situated between said stationary axle and said mantle such that said pressure/temperature regulating fluid functions to regulate temperature only, and said pressure/temperature regulating fluid in said substantially unpressurized chamber does not provide a deflection of the roll mantle;

distributing said pressure/temperature regulating fluid substantially uniformly across the axial length of said adjustable-crown roll such that a substantially constant temperature is maintained across said axial length of said adjustable-crown roll; and regulating the pressure in said one or more pressure chambers by passing any excess amount of said pressure/temperature regulating fluid in said pressure chamber or chambers into said substantially unpressurized chamber through a pressure-difference regulator.

2. An apparatus for regulating the temperature of an adjustable crown-roll, said adjustable crown-roll comprising a stationary axle, a plurality of end bearings, a roll mantle arranged to be revolvable about said stationary mantle by means of said end bearings, a plurality of longitudinal seals for connecting said stationary axle and said roll mantle to each other, said longitudinal seals, stationary axle and roll mantle defining a pressure chamber or a series of pressure chambers and said longitudinal seals, stationary axle and said mantle also defining a substantially unpressurized chamber, said apparatus further comprising:

a first fluid circulation circuit structured and arranged to supply a pressure/temperature regulating fluid into said pressure chamber or series of chambers for adjusting said roll mantle to a desired position and for maintaining the roll at a desired constant temperature along an axial length of said roll;

a second fluid circulation circuit structured and arranged to supply the same pressure/temperature regulating fluid into said substantially unpressurized chamber for temperature regulation of said roll only, such that said pressure/temperature regulating fluid in said substantially unpressurized chamber does not provide a deflection of the roll mantle; and a pressure-difference regulator connecting said pressure chamber and said substantially unpressurized chamber, said pressure-difference regulator causing excess pressure/temperature regulating fluid to be transferred from said pressure chamber or series of chambers and into said substantially unpressurized chamber in order to regulate the pressure in said pressure chamber or series of chambers; and conducting means for removing excess pressure/temperature regulating fluid from said substantially unpressurized chamber.

3. The apparatus of claim 2, further comprising a a plurality of nozzles mounted in said roll and connected to receive fluid from said first fluid circulation circuit and to transport said fluid to said pressure chambers such that said fluid is substantially evenly distributed along the axial length of said roll and thus functions to maintain said roll at a substantially constant temperature along said axial length.

4. The apparatus of claim 2, further comprising a plurality of nozzles connected to receive fluid from said second fluid circulation circuit and substantially uniformly spaced across the axial length of said roll.

5. The apparatus of claim 2, further comprising means for lubrication of said end bearings of said adjustable-crown roll.

6. The apparatus of claim 5, wherein said means for lubrication comprises a plurality of lubrication nozzles.

7. The apparatus of claim 3, wherein said second fluid circulation circuit is further structured and arranged such that said pressure/temperature regulating fluid provides lubrication to said end bearings.

* * * * *